United States Patent Office 3,833,736
Patented Sept. 3, 1974

3,833,736
CONTROL OF FUNGI
Eric Lionel Frick, Maidstone, and Roy Terry Burchill, Bearstead, England, assignors to National Research Development Corporation, London, England
No Drawing. Filed May 11, 1973, Ser. No. 359,505
Claims priority, application Great Britain, June 15, 1972, 28,026/72
Int. Cl. A01n 9/24
U.S. Cl. 424—343        11 Claims

ABSTRACT OF THE DISCLOSURE

A method for the control of fungi which have an overwintering phase inside the buds of a plant or on other parts thereof comprises treating a plant selected from the group consisting of food crop and ornamental plants whilst the plant or at least the buds thereof are dormant or in a state of near dormancy with a fungicidal composition comprising as an active component a compound selected from the group consisting of medium chain aliphatic acids and alcohols, and esters of medium and short chain aliphatic acids.

BACKGROUND OF THE INVENTION

Field of the Invention

This invention relates to the control of fungi.

Description of the Prior Art

Fungi which overwinter on a plant, especially inside the buds of the plant, are difficult to control as the fungus is already present on the plant in an active form at bud burst. Thus, for example, the fungus *Podosphaera leucotricha* (Ell. and Ev.) Salm. present a major problem to commercial apple growers and, although the fungus has been known as the cause of a disease of apple and pear trees for nearly a century, none of the various methods which have been used in an attempt to combat the fungus have been successful in effecting more than a limited degree of control of the disease. A method has now been discovered employing certain fatty acids and fatty acid derivatives which has been found to give far better control of *Podosphaera leucotricha* and like fungi than it has previously been possible to achieve.

It is known that many of the compounds used in the method of the present invention exert a fungicidal action against certain fungi as disclosed, for example, in the papers "Effects of Vapours of Aromatic Chemicals on Fungi," Journal of Pharmaceutical Sciences, 1961, 50, 665–668; "Antifungal Properties of Methyl Esters of Fatty Acids and 2-Fluoro Fatty Acids," Contributions from Boyce Thompson Institute, 1970, 24, 245–247; and "Action of Odiferous Organic Chemicals and Essential Oils in Wood-Destroying Fungi," Plant Disease Reporter, 1960, 44, 789–792. However, in the above references these compounds are shown to be wholly or partially inactive against a variety of fungi tested. The present discovery, therefore, that fungi which overwinter inside the buds of a plant or on other parts thereof, e.g. *Podosphaera leucotricha* and *Venturia inaequalis*, can now be controlled by these same compounds is clearly an unexpected and unpredictable result, which is even more unpredictable in view of the fact that all previous attempts to control these fungi have failed to a satisfactory degree.

It is also known that many of the compounds may be used against plants, including apples, as chemical pruning agents as disclosed, for example, in the papers "Plant Growth Inhibition by Some Fatty Acids and Their Analogues," Nature, 1964, 202, 511–512; "Chemical Pruning of Plants," Science, 1966, 153, 1382–1383; and "Modern Chemical Pruning of Plants," Florist and Nursery Exchange, Apr. 14, 1970, 6–13; and in the specifications of U.S. Pats. Nos. 3,326,664; 3,340,040; 3,438,765; and 3,620,712. However, the use of these compounds as chemical pruning agents is effective only on rapidly growing plants and it is specifically stated in these publications that dormant or resting plants exhibit no selective response to these compounds, so that no one would expect these compounds to have an important application out of the growing season.

SUMMARY OF THE INVENTION

According to the present invention a method for the control of fungi which have an overwintering phase inside the buds of the plant or on other parts thereof comprises treating a plant selected from the group consisting of food crop and ornamental plants whilst the plant or at least the buds thereof are dormant or in a state of near dormancy with a fungicidal composition comprising as an active component a compound selected from the group consisting of medium chain aliphatic acids and alcohols, and esters of medium and short chain aliphatic acids.

DETAILED DESCRIPTION OF THE PREFERRED EMBODIMENTS

Although the compounds used in the method of the present invention may be saturated or unsaturated and straight or branched chain, saturated straight chain compounds are of rather more interest, i.e. those compounds consisting of a linear alkane substituted at one end by a hydroxy group, carboxy group or carbalkoxy group in which the alkyl group is straight chain.

Medium chain acids and alcohols of interest are those containing from about six to about eighteen carbon atoms. Compounds of especial interest are those containing from six or eight to twelve or fourteen carbon atoms, particularly those containing the even number eight and ten carbon chains and those containing the odd number seven and nine carbon chains.

Specific examples of acids and alcohols which may be used in the method of the present invention include: hexanoic acid, heptanoic acid, octanoic acid, nonanoic acid, decanoic acid, undecanoic acid, dodecanoic acid, tetradecanoic acid, pelargonic acid, hexan - 1 - ol, heptan-1-ol, octan-1-ol, nonan-1-ol, decan-1-ol, dodecan-1-ol, tetradecan-1-ol, 2 - ethylhexan - 1 - ol, 3,5,5 - trimethyl-hexan-1-ol, 4,6 - dimethylheptan -2 - ol, 2,4,6-trimethylheptan-1-ol, and 2 - methyloctan - 1 - ol. Specific examples of longer chain compounds which may be used, but are generally of rather lesser interest, include hexadecanoic acid, octadecanoic acid, oleic acid, linoleic acid, hexadecan-1-ol and octadecan-1-ol.

Esters of interest are those containing from five to twenty four carbon atoms having from one to eighteen carbon atoms in the alcohol moiety and from one to eighteen carbon atoms in the acid moiety. Compounds of especial interest are those containing up to fourteen or eighteen carbon atoms with at least one carbon atom in each moiety, for example those containing from six to ten or twelve carbon atoms, particularly those containing at least seven or eight carbon atoms. One group of preferred compounds comprises those containing one, two or three carbon atoms in the alcohol moiety and from six or eight to twelve or fourteen carbon atoms in the acid moiety, particularly the methyl esters of the even number eight and ten carbon chain acids and of the odd number nine and eleven carbon chain acids, and the ethyl esters of the even number six and eight and odd number seven carbon chain acids. Another group of preferred compounds comprises those containing from six or eight to twelve or fourteen carbon atoms in the alcohol moiety and from one to four carbon atoms in the acid moiety, particularly the n-octyl and n-nonyl esters of formic and acetic acid.

Specific examples of esters which may be used in the process of the invention include: methyl hexanoate, methyl octanoate, methyl nonanoate, methyl decanoate, methyl undecanoate, ethyl pentanoate, ethyl hexanoate, ethyl octanoate, ethyl nonanoate, ethyl decanoate, propyl butyrate, propyl hexanoate, propyl octanoate, propyl decanoate, butyl butyrate, butyl hexanoate, butyl octanoate, pentyl propanoate, pentyl butyrate, pentyl hexanoate, hexyl acetate, hexyl butyrate, hexyl hexanoate, octyl formate, octyl acetate, octyl butyrate, nonyl formate, nonyl acetate and decyl formate.

Mixtures of compounds may be used. Thus one composition which has been found to be of particular value contains a mixture of the methyl esters of hexanoic, octanoic, decanoic and dodecanoic acids and another contains a mixture of hexan-1-ol, octan-1-ol, decan-1-ol and dodecan-1-ol. Mixtures in which the $C_8$ and $C_{10}$ acid esters or alcohols predominate are preferred and, indeed, mixtures of these two components alone are of interest.

The method of the present invention may be applied to the control of a wide variety of fungi which have an overwintering phase on a plant. It is particularly applicable to the control of fungi which overwinter inside the buds of a plant, these being either the vegetative or fruit buds, but can also be applied with advantage to the control of fungi which overwinter on other parts of the plant. The range of plants which may be treated is wide including plants which provide food for both animal and human consumption, either for direct consumption as in the case of many fruit bearing plants or for consumption after processing, and plants which are grown for their ornamental appearance, particularly their flowers. Thus, for example, the method may be used for the treatment of apple, pear, peach, cherry, plum, grape, citrus fruits, banana, cereals including rice, lucerne and rose.

Areas in which the method has been found to be of very especial value providing much superior control to that at present possible are the control of scab fungi of the species *Venturia* such as *Venturia inaequalis* (Cke.) Wint. on apples and *Venturia pirina* (Aderh.) on pears and, particularly, *Podosphaera leucotricha* on apples and pears. *Podosphaera leucotricha* is a fungus which overwinters inside the buds of the apple or pear whilst *Venturia inaequalis* and *pirina* whilst capable of overwintering inside the buds of the apple or pear or on infected shoots thereof are more generally found on fallen leaves surrounding the plant.

The method may also be applied to the control of other powdery mildew fungi such as *Sphaerotheca pannosa* (Wallr.) on roses, *Sphaerotheca pannosa* var. *Persicae* (Woron.) on peaches and the powdery midew fungi which affect cherry, peach, grape and cereals, and to a wide variety of other fungi such as the leafcurl fungus *Taphrina deformans* (Berk.) on peaches, cherry leaf spot, rust diseases in general, downy mildew, dead arm of grape, nectria canker, fabraea leaf spot of pear, and black knot and pocket of plum.

The method may be applied to various forms of a plant, for example in the case of apples to rootstocks and particularly to bushes and trees.

Treatment with the fungicidal composition is effected whilst the plant is either dormant or in a state of near dormancy. It is not necessary for the plant to be wholly dormant so long as it is not in a state of active growth.

Thus, for example, when treating plant buds infected by an overwintering fungus such as *Podosphaera leucotricha* on apple and pear, treatment may be effected whilst the buds are dormant, but before leaf fall as the winter period of dormancy of the plant approaches, or just as the buds begin to swell in the first stage of bud burst. In the former instance the season of active growth of the plant has ceased whilst in the latter it has not quite started. The normal period of treatment in the Northern Hemisphere is thus from about October to March, although it will be appreciated that the exact period will vary from year to year. Treatment before leaf fall at the beginning of this period, e.g. during October and November, is generally more effective than treatment at the end of the period. Treatment at the end of the period, e.g. in early or late March, is nevertheless still very effective in controlling the fungus and may, if desired, be used together with a treatment at the beginning of the period before leaf fall. It should be appreciated, furthermore, that the optimum time for treatment will depend to some extent on the plant and the fungus being treated. Thus in the case of the treatment of *Venturia inaequalis* and *pirina* on apple and pear there is a particular advantage in treatment before leaf fall since this not only combats any fungus in the buds or on infected shoots but also fungus which would otherwise overwinter on leaves around the trees.

The fungicidal compositions are generally found to possess a phytotoxic action on the plant as well as a fungicidal action. It is, however, possible in the treatment of infected buds by selection of the conditions of application of the fungicidal composition to effect control of the fungus with a varying degree of concomitant destruction of the infected buds. It will be appreciated that, providing the infection in the bud is destroyed and the bud has not been unduly damaged by the infection, it is advantageous that the bud is not itself destroyed and can thus develop when the growing season arrives, and the conditions of application are preferably selected with this end in view. However, even if the method is applied in such a way as to destroy all of the diseased buds this will equally well effect control of the fungus and still provides a superior method of control to those at present available.

The compounds are applied to the plant in the form of a composition comprising a suitable diluent or carrier, for example water, an organic solvent or a mixture thereof, the composition usually being applied as a fine spray of liquid and particularly as an emulsion, although the use of other forms of treatment is not excluded. A composition in concentrated form, even of the pure compound(s), may conveniently be supplied and diluted prior to application, suitable concentrations of the compound(s) at application being in the range from ½ to 1% or 5 or 6%, for example 3 or 5%, or even in certain instances as high as 10% (w./v.). It will be appreciated that the use of as low a concentration as possible consistent with effective control of the fungus is preferred in order to minimise any phytotoxic effect of the composition. Whilst treatment of the buds is most important in the case of bud-overwintering fungi, it is in practice usually simplest to apply the composition to the whole of the plant. In the case of apples and pears, for example, one treatment of the whole plant can provide control of not only *Podosphaera leucotricha* but also *Venturia* fungi.

In order to ensure thorough wetting, it is preferred, particularly in the case of the acids and alcohols to apply the compounds in the form of a composition comprising an effective proportion of a suitable surface active agent. Whilst a wide variety of surface active agents may be used, anionic and particularly non-ionic materials are preferred, if desired in admixture together and/or with a minor proportion of a cationic surface active agent. Examples of types of surface active agents which may be used are:

(1) The polyethylene oxide condensates of alkyl phenols, e.g. the condensation products of alkylphenols or dialkylphenols wherein the alkyl group contains from about 6 to about 12 carbon atoms in either branched chain or particularly straight chain configuration, with ethylene oxide, the said ethylene oxide being present in amounts equal to about 5 to about 25 moles of ethylene oxide per mole of alkylphenol.

(2) The ammonia, monoethanol and diethanol amides of fatty acids having an acyl chain of from about 8 to about 18 carbon atoms. These acyl chains are normally derived from naturally occurring glycerides (e.g. coconut oil, palm oil, soybean oil and tallow) but can be derived synthetically (e.g. by the oxidation of petroleum, or by hydrogenation of carbon monoxide by the Fischer-Tropsch process).

(3) Fatty acid esters of polyoxyethylene sorbitan and sorbitol containing from about 3 to about 80 oxyethylene units per molecule and containing fatty acid groups having from about 8 to about 18 carbon atoms.

(4) The condensation product of aliphatic alcohols having from about 8 to about 18 carbon atoms, in either straight chain or branched chain configuration, with ethylene oxide, the said ethylene oxide being present in amounts equal to about 30 to about 60 moles of ethylene oxide per mole of alcohol.

(5) Anionic surfactants which are the phosphate esters of polyoxyethylenated alkylphenols, such as nonyl phenol, and aliphatic alcohols, such as tridecyl alcohol. These surfactants have the general formulae $$R-O-(CH_2CH_2O)_nPO_3M_2$$

and $$[R-O-(CH_2CH_2O)_n]_2PO_2M$$

wherein R is an alkyl or alkyl phenyl group containing from about 8 to about 20 carbon atoms, wherein $n$ is a number from about 3 to about 40, and wherein M is an alkali metal, e.g. sodium or potassium, and mixtures thereof.

Of these the fatty acid esters of polyoxyethylene sorbitol and especially polyoxyethylene sorbitan are of particular interest. Suitable fatty acids useful in forming the esters include octanoic, nonanoic, decanoic, undecanoic, dodecanoic, tridecanoic, tetradecanoic, pentadecanoic, hexadecanoic, heptadecanoic and octadecanoic acids or mixtures thereof. For ease of formulation the ester preferably contains not more than about thirty oxyethylene units, for example from 3 or 5 to about 10 or from about 10 to about 30 units. Examples of preferred surface active agents of this type are particularly the mono-dodecanoate ester of polyethoxylated sorbitan containing an average of about 20 oxyethylene units per molecule, but also the mono-oleate and mono-octadecanoate esters of polyethoxylated sorbitan containing an average of about 20 oxyethylene moieties per molecule and the mono-dodecanoate ester of polyethoxylated sorbitan containing an average of about five oxyethylene units per molecule. Examples of other surface active agents include the following condensation products: 1 mole of sorbitan monododecanoate with 4 moles of ethylene oxide, 1 mole of sorbitan mono-octadecanoate with 4 moles of ethylene oxide, and 1 mole of sorbitan mono-oleate with 5 moles of ethylene oxide.

The use of a suitable surface active agent can often give significantly improved results aiding particularly in achieving a balance between fungicidal and general phytotoxic actions. The best form of surface active agent for use in any particular situation may readily be ascertained by a series of simple tests on small specimens in the greenhouse (as described in the Examples) these being more readily carried out and giving a good indication of the requirements for the outdoor treatment of the plants.

The proportion of surface active agent used can vary widely according to the circumstances. Thus although in some instances a small proportion by weight of from about 0.01 to about 0.05% may be used, in other instances it may be desirable to increase the proportion significantly, for example to give 1 part by weight of surface active agent to from about 1 to about 2, 3 or up to 5 parts of compounds.

In addition to surface active agents other additives may be included, most particularly emulsifiers (although many of the surface active agents themselves act as emulsifiers), for example compounds such as Triton ×100.

The invention is illustrated by the following Examples.

EXAMPLE 1

Effect of fungicidal composition on *P. leucotricha* on apples (a) Six year old heavily mildewed apple trees (clone M3) are sprayed high volume by hand lance at different times with fungicidal compositions containing either an alkanol mixture comprising: 0.5% hexan-1-ol, 42% octan-1-ol, 56% decan-1-ol, and 1.5% dodecan-1-ol, or a methyl alkanoate mixture comprising 4% methyl hexanoate, 56% methyl octanoate, 38% methyl decanoate, and 2% methyl dodecanoate, (the percent being w./w. in each case), in combination with the surface active agent Tween 80 [polyoxyethylene (20) sorbitan mono-octadecenoate].

The exact conditions of treatment are shown in Table 1, both autumn applications being made whilst the leaves are still green and the spring application just as the buds begin to swell in the first stage of bud burst. Assessments of the effect of the treatment are made in April/May when primary mildew infections will be clearly visible. The total number of buds, and whether each is healthy, mildewed or dead, is recorded on ten one year old shoots per tree. All the primary infections on each tree are also counted.

Results typical of those obtained are shown in Tables 1 and 2. It will be seen that the early autumn sprays give better mildew control than the later ones, but are more damaging to the upper part of the shoots, particularly in the case of the alkanol mixture. Typically it is found the additional application in March initially delays bud break but that growth quickly returns to normal, whilst with the other treatments shoot growth is unaffected and if the terminal bud is killed or damaged a single shoot quickly replaces it.

TABLE 1.—EFFECT OF TREATMENT ON OVERALL REDUCTION OF PRIMARY MILDEW

| Details of treatment [1] | Number of trees | Total mildewed buds | Average mildewed buds per tree | Percent mildew reduction |
|---|---|---|---|---|
| 1. 5% methyl alkanoates in early October. | 8 | 13 | 1.6 | 98.7 |
| 2. 5% alkanols in early October. | 8 | 11 | 1.4 | 98.9 |
| 3. 5% methyl alkanoates in early November. | 9 | 112 | 12.3 | 90.3 |
| 4. 5% alkanols in early November. | 9 | 88 | 9.8 | 92.3 |
| 5. 5% methyl alkanoates in early October followed by 2.5% methyl alkanoates in late March. | 8 | 1 | 0.1 | 99.9 |
| 6. Unsprayed control. | 20 | 2,535 | 126.7 | |

[1] All percentages are w./v.

TABLE 2.—EFFECT OF TREATMENT ON PRIMARY BUD INFECTIONS

| | Number of trees | Total number of buds | Percent Dead | Percent Healthy | Percent Mildewed |
|---|---|---|---|---|---|
| Treatment: | | | | | |
| 1 | 8 | 2,138 | 15.7 | 84.2 | 0.1 |
| 2 | 8 | 2,184 | 17.1 | 82.7 | 0.2 |
| 3 | 9 | 2,278 | 6.3 | 91.3 | 2.4 |
| 4 | 9 | 2,456 | 5.4 | 93.8 | 0.8 |
| 5 | 8 | 2,132 | 14.5 | 85.5 | 0.0 |
| 6 | 20 | 5,315 | 6.4 | 76.7 | 16.9 |

(b) A range of acids, alcohols and esters comprising heptan-1-ol, octan-1-ol, nonan-1-ol, decan-1-ol, octan-1-ol/decan-1-ol mixtures, 3,5,5-trimethylhexan-1-ol, methyl octanoate, methyl decanoate, methyl octanoate/methyl decanoate mixtures, decanoic acid, ethyl octanoate and n-hexyl acetate, are used substantially as described under (a) for the control of *P. leucotricha* on apples. Typically each of these compounds effects control of the fungus but with varying levels of phytotoxic effect.

(c) Tests of fungicidal compositions are carried out in the greenhouse to study the relative activity of various compounds. The following active ingredients are used: the alkanol and methyl alkanoate mixtures described under (a) at 3 and 5% (w./v.) concentration and heptan-1-ol, octan-1-ol, nonan-1-ol, decan-1-ol, 3,5,5-trimethylhexan-1-ol, methyl octanoate, methyl decanoate, octanoic acid and decanoic acid at 5% (w./v.) concentration. In addition compositions contain by volume 0.5% acetone, 0.015% Triton ×100 and 0.05% Tween 80 in water. Heavily mildewed potted apple root-stocks are sprayed once during the dormant season with the composition and assessments of the effect of the treatment are made in April/May when primary mildew infections will be clearly visible.

Typically the results are as follows. The treatments with 3% alkanol or methyl alkanoate mixtures are less damaging than those with 5% mixtures but give somewhat less effective control of the primary mildew. Methyl decanoate is more damaging than methyl octanoate but gives more effective control, but decanoic acid is less damaging than octanoic acid whilst giving effective primary mildew control. Among the alcohols the following relative levels of damage are found: heptan-1-ol<nonan-1-ol∼3,5,5-trimethylhexan-1-ol<octan-1-ol<decan-1-ol and of primary mildew control 3,5,5-trimethylhexan-1-ol>nonan-1-ol>decan-1ol>octan-1-ol>heptan-1-ol.

EXAMPLE 2

Effect of fungicidal composition on *V. inaequalis* on apples

Six year old apple trees (clone M3) infected with apple scab (*Venturia inaequalis*) are sprayed high volume by hand lance during the autumn whilst the leaves are still green with fungicidal compositions containing either an alkanol mixture comprising 0.5% hexan-1-ol, 42% octan-1-ol, 56% decan-1-ol and 1.5% dodecan-1-ol, or a methyl alkanoate mixture comprising 4% methyl hexanoate, 56% methyl octanoate, 38% methyl decanoate, and 2% methyl dodecanoate (the percent being w./w. in each case), in combination with the surface active agent Tween 80 [polyoxyethylene (20) sorbitan mono-octadecanoate].

Varying conditions of treatment are used as shown in Table 3, and the effect of the treatment are made in the spring by measurement of the Ascospore concentrations released. Results typical of those obtained are shown in Table 3.

TABLE 3

Effect of treatments on Ascospore concentrations of *Venturia inaequalis*

Details of treatment [1]: Ascospore concentration ml.⁻¹
1. 10% methyl alkanoates _____ 0
2. 5% methyl alkanoates _____ 0
3. 2.5% methyl alkanoates _____ 0
4. 10% alkanols _____ 0
5. 5% alkanols _____ 0
6. 2.5% alkanols _____ 0
7. Control sprayed with water _____ 618,000

[1] All percentages are w./v.

We claim:
1. A method for the treatment of plants in order to inhibit infection caused by a fungus of the type which is capable of overwintering in the bud of the plant, which fungus infection is caused by a fungus selected from the group consisting of *Venturia inatequalis*, *Venturia pirina* and *Podosphaera leucotricha*, which consists essentially of applying a fungicidal amount of an aliphatic alcohol containing 6 to 18 carbon atoms to the buds of the plant during the period of dormancy of said buds.

2. A method according to claim 1, wherein said alcohol is selected from the group consisting of hexan-1-ol, octan-1-ol, decan-1-ol and dodecan-1-ol.

3. A method according to claim 2, wherein said alcohol is selected from the group consisting of octan-1-ol and decan-1-ol.

4. A method according to claim 1, wherein said alcohol is selected from the group consisting of 3,5,5-trimethylhexan-1-ol, heptan-1-ol and nonan-1-ol.

5. A method according to claim 1, wherein the alcohol is applied to the plant in the form of a composition containing from ½ to 6% (w./v.) of the alcohol in an inert medium.

6. A method according to claim 5, wherein said composition contains from 1 to 5% (w./v.) of the alcohol in an inert medium.

7. A method according to claim 1, wherein the alcohol is applied to the plant in the form of a composition containing a non-ionic or anionic surface active agent.

8. A method according to claim 7, wherein said surface active agent is a fatty acid ester of polyoxyethylene sorbitan containing from about 3 to about 80 oxyethylene units per molecule and wherein the fatty acid group has from about 8 to about 18 carbon atoms.

9. A method according to claim 8, wherein said surface active agent is selected from the group consisting of a dodecanoate ester of polyethoxylated sorbitan containing an average of 20 oxyethylene units per molecule, an oleate ester of polyethoxylated sorbitan containing an average of 20 oxyethylene units per molecule, and a dodecanoate ester of polyethoxylated sorbitan containing an average of about five oxyethylene units per molecule.

10. A method according to claim 1, wherein the plant is selected from the group consisting of apple tree, pear tree, peach tree and rose bush.

11. A method according to claim 10, wherein the plant is an apple tree.

References Cited

UNITED STATES PATENTS

| | | | |
|---|---|---|---|
| Re. 20,869 | 10/1938 | Bousquet | 424—343 |
| 1,826,065 | 10/1931 | Fulton et al. | 424—343 |
| 3,438,765 | 4/1969 | Tso et al. | 71—78 |
| 3,620,712 | 11/1971 | Conklin | 71—78 |

FOREIGN PATENTS

| | | |
|---|---|---|
| 1,693,734 | 3/1934 | Australia. |
| 565,473 | 11/1944 | Great Britain. |

OTHER REFERENCES

J. Pharm. Sci. 50(8), 665–668 (1961); Maruzz ella et al., "Effects of Vapors of Aromatic Chemicals on Fungi."

ALBERT T. MEYERS, Primary Examiner

D. W. ROBINSON, Assistant Examiner

UNITED STATES PATENT OFFICE
CERTIFICATE OF CORRECTION

Patent No. 3,833,736  Dated  September 3, 1974

Inventor(s) ERIC LIONEL FRICK ET AL

It is certified that error appears in the above-identified patent and that said Letters Patent are hereby corrected as shown below:

Claim 10, line 2, after "apple tree" insert --and--; same line, delete "and peach tree and rose bush".

Claim 6, line 2, delete "1" and insert --3--.

Signed and sealed this 4th day of March 1975.

(SEAL)
Attest:

RUTH C. MASON
Attesting Officer

C. MARSHALL DANN
Commissioner of Patents
and Trademarks